Figures 1, 2:
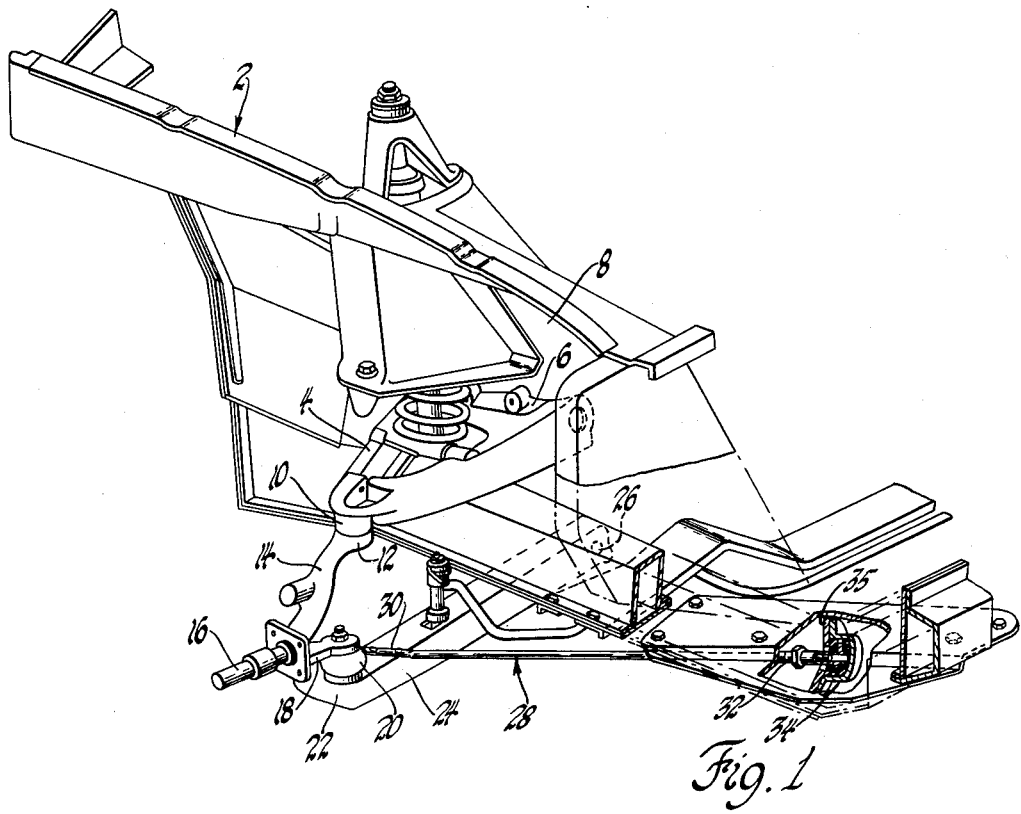

June 14, 1966  C. H. FEHLBERG  3,256,028

CASTER ADJUSTMENT FOR INDEPENDENT WHEEL SUSPENSION

Filed Feb. 27, 1964

INVENTOR.
Chester H. Fehlberg
BY
W. F. Wagner
ATTORNEY

United States Patent Office 3,256,028
Patented June 14, 1966

3,256,028
CASTER ADJUSTMENT FOR INDEPENDENT WHEEL SUSPENSION
Chester H. Fehlberg, Detroit, Mich., assignor to General Motors Corporation, Detroit, Mich., a corporation of Delaware
Filed Feb. 27, 1964, Ser. No. 347,804
5 Claims. (Cl. 280—96.2)

This invention relates to independent front wheel suspension and more particularly to independent suspension wherein the lower control arm assembly includes a strut rod flexibly connected to the vehicle sprung mass in longitudinally displaced relation to the axis of rotation of the wheel.

At the present time, a large number of production passenger vehicles are provided with independent front wheel suspension of the so-called parallelogram type in which the lower control arm assembly includes a single laterally extending beam pivotally connected at its inboard end to the vehicle frame rather than the familiar wishbone having spaced apart inboard pivotal connections. To impart longitudinal stability to the beam, the outboard end thereof is connected to one end of a strut rod, the opposite end of which is flexibly connected to the vehicle frame in general alignment with the pivot axis of the beam. The flexible connection serves not only to cushion longitudinal impact on the wheel, but additionally is ordinarily provided with means for varying the axial position of the strut rod relative to the frame in order to permit adjustment of the caster angle of the wheel knuckle.

In the past, it has been conventional practice to thread the free end of the rod and assemble a nut and washer thereon at opposite sides of opposed biscuit type flexible mounts carried by the frame. With this construction, caster adjustment of the wheel knuckle requires alternate loosening of the nut and washer on one side of the mounting followed by corresponding tightening of the opposed nut and washer, or vice versa. In practice, this procedure is unsatisfactory due to the fact that sequential nature of the operation resulted in "overshooting" or "undershooting" the desired setting and, therefore, required repeated trial and error adjustments. The present invention is, therefore, directed toward a construction in which axial adjustment of the strut rod relative to the elastic mounting may be accomplished in a manner wherein each increment of adjustment results in direct and positive correlated change in caster angle, thereby enabling visual observation of wheel alignment instruments simultaneously with operational adjustment.

An object of the present invention is to provide an improved wheel suspension assembly.

A further object is to provide a wheel suspension assembly including improved means for caster adjustment.

A still further object is to provide an independent wheel suspension of the type including a strut rod having one end flexibly mounted on the vehicle frame wherein the connection between the strut rod and flexible mounting includes means for continuously varying the axial position of the strut rod in either direction to enable initial setting and subsequent readjustment of caster angle without resort to trial and error.

These and other objects, advantages and features of the invention will become more fully apparent as reference is had to the accompanying specification and drawing wherein:

FIGURE 1 is a perspective view, partly in section and with parts broken away, of the forward portion of a vehicle structure including a parallelogram type independent front wheel suspension linkage incorporating the invention; and FIGURE 2 is a greatly enlarged sectional elevational view illustrating the adjustable connection between the forward end of the suspension strut rod and the resilient frame mounting associated therewith.

Referring now to the drawing and particularly FIGURE 1, reference numeral 2 designates generally the forward right hand portion of a vehicle superstructure of the so-called integral body and frame type. Extending laterally outwardly from body frame 2 is a wishbone type upper suspension control arm 4, the bifurcated inboard ends of which are pivotally connected on a pivot shaft assembly 6 secured to the side wall 8 of body frame 2. At its outboard end, control arm 4 is universally pivotally connected by a ball joint assembly 10 to the upper end 12 of a wheel knuckle assembly 14. Knuckle assembly 14 includes a spindle portion 16 adapted to rotatably support the usual vehicle front wheel, not shown. The lower end 18 of wheel knuckle 14 in turn is connected by ball joint assembly 20 to the outer end 22 of a transversely extending beam type lower suspension control arm 24, the inboard end of which is pivotally connected to body frame 2 on a short longitudinal pivot shaft 26. In order to impart longitudinal stability to the outer portion of beam 24, a diagonally disposed strut rod 28 is rigidly connected, as by riveting, at its rearward end 30 near the outer end 22 of beam 24, while the forward end 32 is operatively connected to an elastic mounting 34 secured on bracket 35 formed on body frame 2 forwardly of pivot 26.

According to the invention, the forward end 32 of rod 28 is connected to mount 34 in a manner enabling displacement of the rod along its axis relative to mounting 34 so as to permit initial adjustment or subsequent readjustment of the plane of movement of beam 24 which in turn determines the caster angle of the wheel knuckle. In the illustrated embodiment, adjustment is accomplished by continuous rotational movement in either a clockwise or a counterclockwise direction so that both forward and rearward direct and positive displacement response is achieved. As a result, when it is desired to either initially establish the desired wheel caster angle or alternatively, to accomplish readjustment under service conditions, the results obtained for each increment of adjustment are immediately reflected in conventional wheel alignment equipment.

In order to attain this objective in accordance with the present invention, as seen best in FIGURE 2, the forward end of strut rod 28 is provided with a threaded portion 36 over which is disposed a jam nut 38 and an internally threaded tubular member 40 having a wrench engageable rearward portion 42 and a circumferential rib portion 44 formed near the forward end thereof. Disposed in surrounding relation with tubular member 40 at opposite sides of rib 44 are a pair of low friction bearing members 46 and 48 having cylindrical bearing portions 50 and 52 and axial bearing portions 54 and 56. Disposed in turn over the cylindrical bearing portions 50 and 52 and abutting axial bearing portions 54 and 56 are a pair of annular elastic members 58 and 60 which in assembled relation are compressed to a predetermined degree between the forward face 62 of body wall bracket 35 and the rearward face 64 of a flanged cup-shaped retainer member 66. Retainer 66 in turn is rigidly secured to bracket 35 by bolts 68 and 70, thereby maintaining the preload on elastic members 58 and 60.

When assembled in the manner described, the adjustable mounting operates in the following manner. To initially set or subsequently reset the wheel caster angle, the jam nut 38 is backed off a sufficient distance to permit axial movement of the strut rod threaded portion 36 into the tubular member 40. Tubular member 40 may then be rotated clockwise or counterclockwise, as required, by a suitable wrench to displace the rod relative to the tubular member in the direction indicated by conventional wheel alignment equipment. The tubular member remains axially stationary relative to the bearing members 46 and 48, while the rod 28 is positively displaced in accordance with the number of turns imparted to tubular member 40. When the appropriate caster angle has been achieved, the operation is completed by tightening jam nut 38 against the end 72 of tubular member 40 to prevent any possibility of relative rotation between rod 28 and tubular member 40.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A vehicle suspension linkage comprising an upper transversely extending control arm and a lower transversely extending beam each of which is pivotally connected at its inner end to said vehicle, a wheel knuckle extending between and pivotally connected at its opposite ends to the outer ends of said control arm and said beam, respectively, a strut rod rigidly connected at one end to said beam, a flexible mounting secured on said vehicle at the other end of said rod, manually rotatable means confined axially in said mounting and threadably engaging said rod, and means on said rod operable to lock said rotatable means in any selected rotational position.

2. A vehicle suspension linkage comprising, an upper transversely extending control arm and a lower transversely extending beam each of which is pivotally connected at its inner end to said vehicle, a wheel knuckle extending between and pivotally connected at its opposite ends to the outer ends of said control arm and said beam, respectively, a strut rod rigidly connected at one end to said beam, a flexible mounting secured on said vehicle at the other end of said rod, manually rotatable means resiliently confined axially in said mounting and threadably engaging said rod, and means on said rod operable to lock said rotatable means in any selected rotational position.

3. In a device of the class described, an adjustable strut rod mounting comprising a tubular member threadably disposed over one end thereof, means forming a radially outwardly extending flange on said member, a pair of annular elastic elements surrounding said tubular member and abutting the opposite sides of said flange, a retainer enveloping said elastic elements including means for establishing and maintaining a predetermined axial preload thereon, manually engageable means for rotating said member, and manually operable means for locking said member against rotation.

4. The structure set forth in claim 3 including low friction bearing elements interposed between said tubular member and said elastic elements.

5. The structure set forth in claim 4 wherein said low friction bearing members include portions engaging said radial flange.

References Cited by the Examiner

UNITED STATES PATENTS

| 2,115,915 | 5/1938 | McCain | 280—96.2 |
| 2,675,977 | 4/1954 | Berlichingen et al. | 267—71 X |
| 2,742,302 | 5/1956 | Pointer | 267—67 |
| 2,841,388 | 7/1958 | Hehn | 248—358 X |
| 2,900,162 | 8/1959 | Crede et al. | 248—358 |
| 3,039,831 | 6/1962 | Thomas. | |
| 3,079,137 | 2/1963 | Schilberg | 280—96.2 X |
| 3,135,332 | 3/1964 | Peras | 267—67 X |
| 3,139,275 | 6/1964 | Burkitt | 280—96.2 X |
| 3,151,877 | 10/1964 | Bajer | 280—96.2 X |

FOREIGN PATENTS

| 254,414 | 7/1926 | Great Britain. |

MILTON BUCHLER, *Primary Examiner.*

KENNETH H. BETTS, *Examiner.*